June 14, 1955     J. TRAMMELL, JR     2,710,686

VEHICLE STEERING WHEEL ASH TRAY ATTACHMENT

Filed Aug. 25, 1953

*INVENTOR.*
JAMES TRAMMELL, JR.
BY
Attorney

2,710,686

VEHICLE STEERING WHEEL ASH TRAY ATTACHMENT

James Trammell, Jr., Chicago, Ill.

Application August 25, 1953, Serial No. 376,339

4 Claims. (Cl. 206—19.5)

My invention relates to ash tray attachments securable removably to the steering wheel structures of vehicles.

An important object of my invention is to provide an ash tray attachment of the aforementioned character which is secured in position when the steering wheel is in normal position for driving directly ahead, or straight ahead, maintaining the lid thereof open, so that the ash tray will be available for use by the driver, or operator.

Another object of my invention is to provide lid means which is movably confined so as to close the ash tray, or act as a closure for the ash tray compartment, when the steering wheel is rotated clockwise or counter-clockwise.

A still further object of my invention is to provide in an ash tray of the aforementioned character means whereby the movable lid element will at all times maintain the ash tray confines open when the vehicle steering wheel is in normal position for straight ahead driving.

A still further object of my invention is to provide in an ash tray attachment clamping means and securing means for attaching the said ash tray device to the horn rim mechanism, a component structure of the steering wheel mechanism of a vehicle.

A still further object of my invention is to provide an ash tray attachment of the aforementioned character which can be readily attached to, or removed from, a vehicle steering wheel, one which is simple enough to lend itself ideally to economical manufacture in quantity production.

Other objects and advantages, resident in my invention, will become apparent from an examination of the accompanying drawings, bearing further elucidation in the ensuing description, wherein like symbols are used to designate like parts, and in which.

Figure 1:
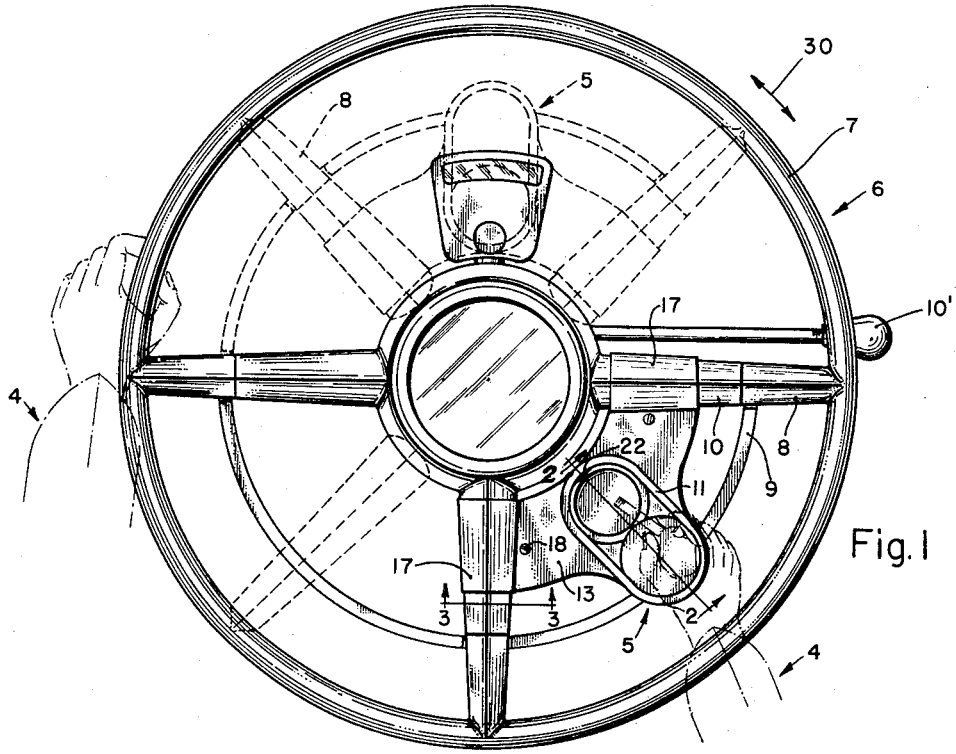
Fig. 1 is a top elevational view looking directly at the steering wheel structure of a vehicle and showing my invention removably attached thereto.
Figure 2:
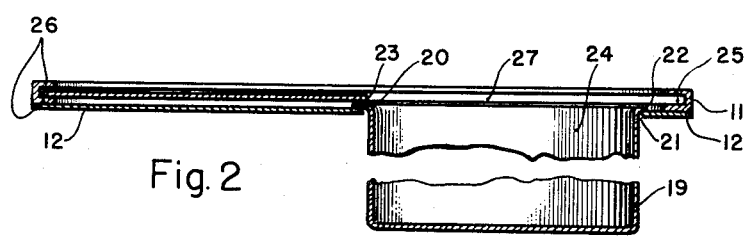
Fig. 2 is a cross-sectional view taken substantially on the line 2—2 of Fig. 1.
Figure 3:
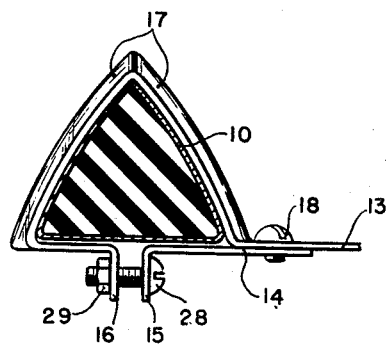
Fig. 3 is a cross-sectional view taken substantially on the line 3—3 of Fig. 1.

Referring to the various views my invention is generally designated 5, and is shown mounted on a steering wheel 6 of a vehicle, and showing the invention in use by indicating the phantom lines of the arms of a person sitting behind the steering wheel 6, whose arms are designated generally 4.

The conventional steering wheel structure consists of a wheel element 7 having a number, or plurality, of spokes 8 and having the horn rim actuator 9 secured to the spoke section 10, so as to actuate the horn contacts by depression of the horn rim element 9.

It will be noted that my invention, generally designated 5, consists of a channelled structure 11 of oval configuration, having lips 26 at the top and bottom thereof, the bottom lip being secured to the plate element 12 which extends to form the flanges 13 and the securing clamps 17 which are triangularly shaped in cross-section, also being formed to include attaching lug 16 which in concert with complementary lug elements 15 are securable by screws 28 and lock nuts 29, or any other suitable fastening may be employed. The complementary lug elements 15 are riveted to plate element 12 by rivets 18.

It will be noticed that the upper portion of the channel structure 11 provides an opening 25 of oval configuration, and also a guideway 27 for the lid 23 to slidably and/or rotatably function therein. An opening 21 is provided to receive the removable ash tray 24, which is made of a suitable depth so as not to interfere with the gear shift hand lever 10' indicated in Fig. 1. The ash tray 24 consists of an outer casing 19 and has a flanged portion 20 so as to rest and be positioned removably with respect to the opening 21 in the bottom plate element 12. The flange 20 is cut off to furnish a flat portion 22 so that the same may be held in locked position as indicated in Fig. 1, when the lid 23 overlaps the flange portion 20, or when the flange 20 is rotated to a diametrically opposed position the flat portion 22 will be tangent to the circumferential perimetral portion of the lid 23, and permit its removal for emptying the contents thereof.

The steering wheel, generally designated 6, may be rotated clockwise or counter-clockwise, as indicated by the arrows 30, in which event the lid 23 will be caused to operate within the channel guideway 27 and maintain the ash receptacle 24 available for use as indicated in full lines in Fig. 1, or tend to close the same when reaching the position indicated by the dotted lines in Fig. 1, where the contents might have a tendency to spill. In fact as soon as the tray attachment 5 is rotated clockwise a slight distance past the position of spoke 8, about 50° counter-clockwise rotation would tend to cause the lid 23 to move to closed position, and remain closed until the steering wheel is brought back to normal position.

Thus, when steering of the vehicle is required, in turning to left, or right, or making complete turns, the numerous times that the steering wheel 6 has to be rotated either clockwise or counter-clockwise, will tend to motivate the lid 23 either clockwise or counter-clockwise simultaneously moving it within the longitudinal orbit of the channel way 27. Thus, the contents of the ash tray will never be spilled during operation of the steering wheel for steering purposes to deviate the vehicle from its straight path.

It will be noted that the arrangement of the ash tray attachment or mechanism 5 is such as not to interfere with the normal operation of the vehicle. It will provide an ash tray for the driver conveniently at hand, so as not to detract him from his responsibility in the operation of the vehicle, and simultaneously will provide an automatic closure whenever the vehicle wheel has to be rotated clockwise or counter-clockwise, maintaining the ash tray in operative or open position at all times when the vehicle is driven straight forward.

Although the drawings and the above specification disclose the best modes in which I have contemplated embodying my invention, I desire to be in no way limited to the details of such disclosure, for in the further practical application of my invention many changes in the form and construction thereof may be made as circumstances require or experience suggests without departing from the spirit of the invention as expounded within the scope of the appended claims.

Having thus described and revealed my invention, what I claim as new and desire to secure by Letters Patent is:

1. Normally open ash tray means removably securable to the angularly positioned steering wheel of a vehicle, comprising an enclosed channel guideway of oval configuration, a bottom plate element secured to the bottom of the said channel guideway and provided with web portions terminating in clamping portions adapted to be secured to adjacent spoke elements of the said steering wheel, and further provided with a circular cavity adapted to retain removably a flanged ash tray receptacle, a flanged ash tray receptacle, and a circular lid operating within the confines of the said channel guideway through the agency of gravitational force to effectively close the said ash tray receptacle when the said steering wheel is engaged in deviation of the said vehicle from its normally straight path, the said flanged ash tray receptacle having a portion of its flange cut away to permit its removal for clearing or emptying the same.

2. Normally open ash tray means removably securable to the angularly positioned steering wheel of a vehicle, comprising an enclosed channel guideway of oval configuration, a bottom plate element secured to the bottom of the said channel guideway and provided with web portions terminating in clamping portions adapted to be secured to adjacent spoke elements of the said steering wheel, and further provided with a circular cavity adapted to retain removably a flanged ash tray receptacle, a flanged ash tray receptacle, and a circular lid operating within the confines of the said channel guideway through the agency of gravitational force to effectively close the said ash tray receptacle when the said steering wheel is engaged in deviation of the said vehicle from its normally straight path, the said flanged ash tray receptacle having a portion of its flange cut away to permit its removal for clearing or emptying the same, the said channel guideway being equivalent in magnitude to a sum of less than twice the diametral magnitude of the said circular lid.

3. Normally open ash tray means removably securable to the angularly positioned steering wheel of a vehicle, comprising an enclosed channel guideway of oval configuration, a bottom plate element secured to the bottom of the said channel guideway and provided with web portions terminating in clamping portions adapted to be secured to adjacent spoke elements of the said steering wheel, and further provided with a circular cavity adapted to retain removably a flanged ash tray receptacle, a flanged ash tray receptacle, and a circular lid operating within the confines of the said channel guideway through the agency of gravitational force to effectively close the said ash tray receptacle when the said steering wheel is engaged in deviation of the said vehicle from its normally straight path, the said flanged ash tray receptacle having a portion of its flange cut away to permit its removal for clearing or emptying the same, the said clamping portions being cross-sectionally configurative substantially to the cross-section of the said spoke elements.

4. Normally open ash tray means removably securable to the angularly positioned steering wheel of a vehicle, comprising an enclosed channel guideway of oval configuration, a bottom plate element secured to the bottom of the said channel guideway and provided with web portions terminating in clamping portions adapted to be secured to adjacent spoke elements of the said steering wheel, and further provided with a circular cavity adapted to retain removably a flanged ash tray receptacle, a flanged ash tray receptacle, and a circular lid operating within the confines of the said channel guideway through the agency of gravitational force to effectively close the said ash tray receptacle when the said steering wheel is engaged in deviation of the said vehicle from its normally straight path, the said flanged ash tray receptacle having a portion of its flange cut away to permit its removal for clearing or emptying the same, the said channel guideway being equivalent in magnitude to a sum of less than twice the diametral magnitude of the said circular lid, the said clamping portions being cross-sectionally configurative substantially to the cross-section of the said spoke elements.

References Cited in the file of this patent

UNITED STATES PATENTS

| | | |
|---|---|---|
| 1,289,978 | Ward | Dec. 31, 1918 |
| 1,321,414 | Brouillette | Nov. 11, 1919 |
| 1,404,755 | Gay | Jan. 31, 1922 |
| 1,622,586 | Hoffman | Mar. 29, 1927 |
| 1,892,721 | Cardarelli | Jan. 3, 1933 |
| 1,923,529 | Cohen | Aug. 22, 1933 |

FOREIGN PATENTS

| | | |
|---|---|---|
| 34,794 | France | Apr. 23, 1929 |